(12) United States Patent
Van Den Bijgaart et al.

(10) Patent No.: US 9,416,883 B2
(45) Date of Patent: Aug. 16, 2016

(54) VALVE DEVICE

(75) Inventors: Adrianus Wilhelmus Dionisius Maria Van Den Bijgaart, Eindhoven (NL); Ronald Cornelis De Gier, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 924 days.

(21) Appl. No.: 11/993,503

(22) PCT Filed: Jun. 26, 2006

(86) PCT No.: PCT/IB2006/052078
§ 371 (c)(1),
(2), (4) Date: Dec. 21, 2007

(87) PCT Pub. No.: WO2007/004105
PCT Pub. Date: Jan. 11, 2007

(65) Prior Publication Data
US 2010/0078584 A1  Apr. 1, 2010

(30) Foreign Application Priority Data

Jun. 30, 2005  (EP) ..................................... 05105930

(51) Int. Cl.
| | |
|---|---|
| F16K 7/14 | (2006.01) |
| F16K 7/12 | (2006.01) |
| F15C 5/00 | (2006.01) |
| F16K 7/16 | (2006.01) |
| F16K 99/00 | (2006.01) |

(52) U.S. Cl.
CPC . *F16K 7/126* (2013.01); *F15C 5/00* (2013.01); *F16K 7/16* (2013.01); *F16K 99/0001* (2013.01); *F16K 99/0015* (2013.01); *F16K 99/0057* (2013.01); *F16K 99/0034* (2013.01); *F16K 2099/0084* (2013.01); *Y10T 137/7895* (2015.04)

(58) Field of Classification Search
CPC ................. Y10T 137/7895; F16K 2099/0084; F16K 7/126; F16K 7/16; F16K 99/0001; F16K 99/0015; F16K 99/0034; F16K 99/0057; F16K 5/00; F15C 3/04
USPC .................................. 137/510, 859; 251/331
See application file for complete search history.

(56) References Cited

U.S. PATENT DOCUMENTS

| | | | | |
|---|---|---|---|---|
| 963,045 | A * | 7/1910 | Hulse | 137/510 |
| 2,563,665 | A * | 8/1951 | Thomas | 137/510 |
| 3,582,037 | A * | 6/1971 | Levesque | 251/61.1 |
| 3,620,244 | A * | 11/1971 | Nisley | 137/245 |
| 4,470,760 | A | 9/1984 | Jarrett et al. | |
| 4,657,062 | A * | 4/1987 | Tuerk | 160/243 |
| 4,865,584 | A | 9/1989 | Epstein et al. | |

(Continued)

FOREIGN PATENT DOCUMENTS

| | | |
|---|---|---|
| EP | 1413775 A2 | 4/2004 |
| WO | 02070932 A2 | 9/2002 |

*Primary Examiner* — William McCalister

(57) ABSTRACT

The present invention relates to a valve device (10) comprising a substrate (12) and an elastic membrane (13), the membrane being joined at least around a valve area to the substrate. The substrate comprises a first channel (16) and a second channel (17), both ending in the valve area, the first channel having in the valve area a first channel end surface (19) and the second channel having in the valve area a second channel end surface (21), wherein the area of the first channel end surface is substantially larger than the area of the second channel end surface.

8 Claims, 1 Drawing Sheet

(56) References Cited

U.S. PATENT DOCUMENTS

| | | | |
|---|---|---|---|
| 5,178,182 A | 1/1993 | Kamen | |
| 5,944,050 A * | 8/1999 | Walker | 137/510 |
| 6,056,269 A * | 5/2000 | Johnson et al. | 251/331 |
| 6,382,923 B1 | 5/2002 | Gray | |
| 6,416,293 B1 | 7/2002 | Bouchard et al. | |
| 6,663,359 B2 | 12/2003 | Gray | |
| 2002/0124897 A1 * | 9/2002 | Bergh | F15C 5/00 137/885 |
| 2002/0155010 A1 | 10/2002 | Karp et al. | |
| 2004/0148777 A1 | 8/2004 | Sjolander et al. | |
| 2004/0155213 A1 | 8/2004 | Yoo | |
| 2004/0209354 A1 | 10/2004 | Mathies et al. | |
| 2005/0247354 A1 * | 11/2005 | Hezel et al. | 137/625.65 |

* cited by examiner

VALVE DEVICE

The present invention relates to a valve device. More particular, the present invention relates to a valve device configured to be used in membrane based fluid systems.

Membrane based fluid systems are used to process fluids, for instance bio-fluids. In such systems fluid is often pumped, isolated, mixed, routed, merged, split and/or stored. In order to make this fluid handling possible use is made of valve devices, which may block and/or allow a fluid flow through a fluid channel. In general there is a need in membrane based fluid systems for unidirectional, overflow and bidirectional valve devices.

Examples of membrane based fluid systems can for example be found in U.S. Pat. Nos. 6,382,923, 6,663,359, 5,178,182, 6,416,293, 4,865,584 and 4,470,760. In these systems different valve devices are proposed. However, these valve devices are complex of construction. In particular, these valves are not suitable to be implemented in a single layer substrate.

In US 2004/0209354, US 2002/0155010, US 2004/0155213 and US2004/0148777 a number of examples of one-way valves in substrate systems are described. Also, these one-way valves are complex of construction, whereby each one-way valve device comprises a multilayer substrate. Furthermore, the disclosed valve constructions can only be used as one-way valves.

It is an object of the present invention to provide a valve device which is of relative simple construction so that the valve device may be implemented in a membrane based fluid system comprising a single layer substrate and a membrane.

This object is achieved with a valve device comprising a substrate and an membrane, the membrane being joined to the substrate at least around a valve area, the substrate comprising a first channel and a second channel, both ending in the valve area, the first channel having in the valve area a first channel end surface and the second channel having in the valve area a second channel end surface, wherein the area of the first channel end surface is substantially larger than the area of the second channel end surface.

The valve area is the area in which the substrate and the membrane are not joined to each other. In this area the flexible membrane may be pushed/lifted from the substrate so that there is a space between the substrate and the membrane. Via this space the first and second channel are in fluid communication and fluid may flow from the first channel to the second channel or vice versa. However, when the membrane lies against the substrate in the valve area, which usually will be the normal position the fluid communication between the first and the second channel will be blocked and this no flow between the first and second channel is possible.

The first and second channel end surfaces of the first and second channel, respectively, are the end surfaces of the channels which lie within the valve area and in the plane of the side of the substrate on which the membrane lies.

With substantially larger is meant that the area of the first channel end surface is at least 1.5 times the area of the second channel end surface, preferably at least 2.5 times the area of the second channel end surface, and more preferably at least 5 times the area of the second channel end surface.

The valve device with this construction makes it possible to pump fluid from the first channel to the second channel as the membrane which is flexible will be lifted from the substrate when the pressure in the first channel is increased to a certain level. The fluid will then flow through the (temporary) space in the valve area between substrate and membrane.

Normally a certain force will be needed to lift, in the valve area, the membrane from the substrate. As the first channel end surface is substantially larger than the second channel end surface, the force to open the valve will easier be obtained when fluid is pressurized in the first channel. As the force level can be chosen such that with "normal" fluid pressures only the first channel will produce enough force to lift the membrane from the substrate a unidirectional valve is obtained.

The level of the force needed to open the valve can also be chosen to correspond to a pressure level which is too high for normal use of the system. In such configuration the valve device can be used as an overflow valve.

It is also possible to choose the force level in such a way that from both channels fluid can be pumped through the valve area. It will thereby be clear that with the same opening force level more pressure is needed in the second channel than the first channel for obtaining a flow through the valve area.

In an embodiment at least a part of a longitudinal wall of the first channel and/or the second channel outside the valve area is formed by the membrane. Such channels can easily be made in the substrate. For instance a longitudinal groove can be provided in the substrate which groove is covered by the membrane. In an embodiment both the first and the second channel are constructed in such a way. In another embodiment a single-layer substrate may be provided with two membranes, one on each side of the substrate. Each of the membranes may then form a part of the longitudinal wall of one of the first or second channel. The channel which lies on the side of the membrane opposite the valve area, may then be connected with the valve area with a hole going through the substrate. Such a hole can also easily be made in the substrate.

In an embodiment the valve device comprises a plunger which can be pressed against the membrane in at least a part of the valve area on a side opposite the substrate. The plunger will press the membrane against substrate and can thus be used to set the minimal force which is needed open the valve. Thereby the valve device may comprise a pressure device configured to press the plunger against the membrane. By using a pressure device the minimal force can be set.

In an embodiment, the pressure device may be a passive device, which may or may not be adjustable. For instance the pressure device may comprise a spring element which forces the plunger against the membrane. This spring element may be a leaf spring, or any other suitable spring, such as mechanical, pneumatic, electric or magnetic may be used.

In another embodiment, the pressure device may be an active device which can actively controlled the pressure which is exerted on the plunger and therewith on the membrane.

In an embodiment the plunger comprises a rim configured to be pressed against the membrane, wherein the rim is designed to divide the valve area in a first part and a second part, wherein the first channel end surface is located in the first part and the second channel end surface is located in the second part. By providing a rim on the plunger a higher local pressure can be exerted on the membrane. This provides a better sealing of the membrane against the substrate in the valve area which prevents any leakage when the valve device is closed, i.e. until the set pressure to open the valve has not been reached. With such rim the transition from a closed valve to an open valve and vice versa is substantially sharper. The invention further relates to a membrane based fluid system comprising one or more valve devices according to any of the claims.

Further advantages and characteristics of the valve device according to the invention will herein after the described whereby reference is made to the appended drawings, wherein.

Figure 1:
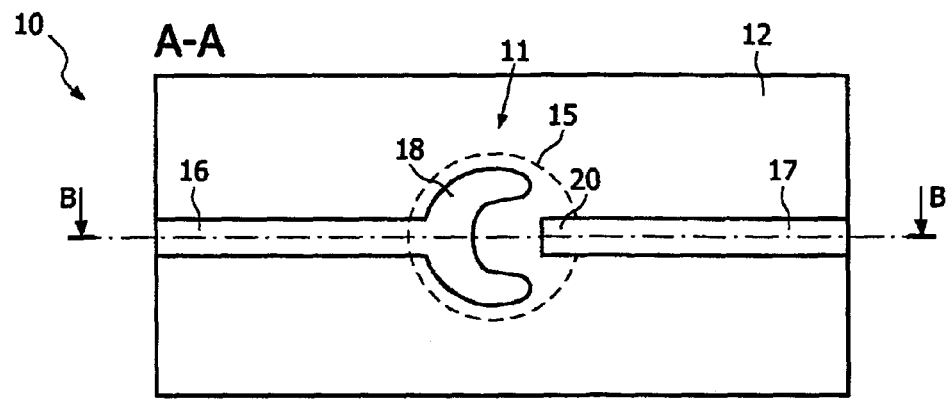
FIG. 1 shows a bottom view of a first embodiment of a valve device according to present invention.
Figure 2:
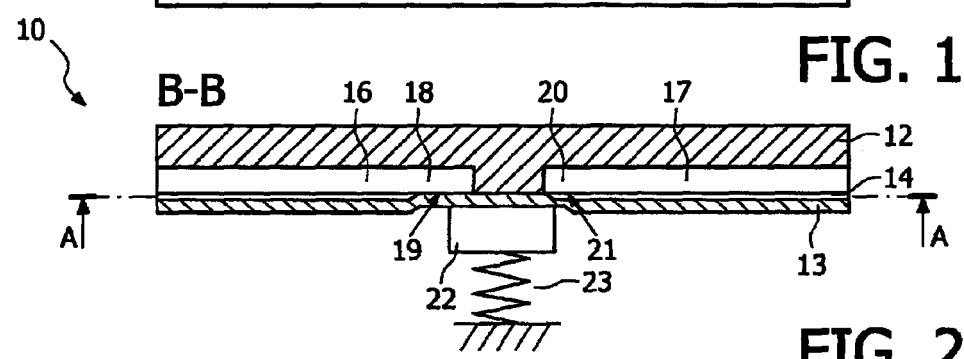
FIG. 2 shows a side view of a cross section of the first embodiment of FIG. 1.

FIGS. 1 and 2 show a first embodiment of a valve device according to the present invention, in general indicated with the reference numeral 10. The valve device 11 comprises a substrate 12 and a flexible membrane 13 which is with a major part of its surface area joined with the substrate 12. In the present embodiment, the substrate 12 and the flexible membrane 13 are connected to each other with a glue layer 14. However, any suitable connection means such as double-sided tape, welding may be used as long as the connection between the substrate 12 and flexible membrane 13 is fluid tight, so that no leakage or contamination can occur.

In a valve area 15 the substrate 12 and the membrane 13 are not connected to each other in order to make a valve mechanism possible. This valve area 15 is in FIG. 1 shown as a dashed circle, but this valve area 15 may have any suitable shape.

In the bottom side of the substrate 12 a first groove and a second groove are provided, which are outside the valve area 15 covered by the membrane 13 to form a first fluid channel 16 and a second fluid channel 17. Such fluid channel 16, 17 can easily be constructed since it is relatively easy to machine or mould a groove in one of the sides of the substrate 12. The membrane 13 which forms a part of a longitudinal wall of the fluid channels 16, 17 can also easily be used since the membrane 13 was already used for the valve mechanism.

Within the valve area 15 the fluid channel 16 comprises a fluid channel end chamber 18 having a channel end surface 19. This channel end surface 19 is the surface area of the fluid channel end chamber 18 which lies in the plane of the bottom surface of the substrate 12. This channel end surface 19 is thus the surface area which exerts a pressure on the membrane 13 when the fluid pressure in the fluid channel 16 is increased. The channel end surface 19 is substantially horseshoe shaped.

Correspondingly the fluid channel 17 comprises within the valve area 15 a fluid channel end chamber 20 having a channel end surface 21. Again, this channel end surface 21 is the surface area which exerts a pressure on the membrane 13 in the valve area 15 when the fluid pressure in the fluid channel 17 is increased.

The valve device 10 further comprises a plunger 22 which is pressed against the membrane 13 on the side opposite the substrate 12 by a pressure device 23 which schematically is indicated with a helical spring. In the present embodiment of the valve device 10, the pressure device 23 is a passive device which means that this pressure device 23 exerts a constant force on the membrane 13 which is not adjusted by a control device or such. In an embodiment it is possible that the passive pressure device may be adjusted, for instance by a set screw. When a passive pressure device 23 is applied the use of a leaf spring is preferred since such pressure device will give a smooth functioning because of the absence of friction and backlash.

The pressure device 23 presses the plunger 22 against the membrane 13 in the valve area 15. As a consequence the membrane 13 is pressed against the substrate 12 so that normally, i.e. when no pumping pressure is exerted in one of the fluid channels 16, 17, no fluid can flow between the substrate 12 and the membrane 13.

When now the fluid pressure in the first fluid channel 16 is increased this fluid pressure multiplied by the area of the channel end surface 19 exerts a force on the membrane 13. If this force is higher than the force exerted by the plunger on the membrane 13, the membrane 13 and the plunger 22 may be lifted from the substrate 12 so that in the valve area 15 a space between the substrate 12 and the membrane 13 comes into existence. Fluid can flow through this space from fluid channel 16 to fluid channel 17. The valve opening force which is needed to open the valve depends on the elasticity of the membrane 13 and the force exerted by the plunger 22. This force is thus set by the spring force, which may be adjustable as explained above. It is remarked that the horseshoe shape of the channel end surface 19 is of advantage as the pressure will more or less equally be divided over the head surface of the plunger 22. In general it is advantageous that one or both of the centers of the channel end surfaces 19, 21 lie in the same line as the center of the surface of the plunger 22 which contacts the membrane 14.

Also, if the fluid pressure in the second fluid channel 17 is increased, this pressure multiplied by the area of the channel end surface 21 provides a force which may be higher than the force exerted by the plunger 22. When this force is higher, the valve may open and fluid may flow from fluid channel 17 to fluid channel 16. However, since the channel end surface 21 is substantially smaller than the channel end surface 19, the fluid pressure needed in fluid channel 17 to open the valve device is substantially higher than the fluid pressure needed in fluid channel 16 for doing the same.

Dependent on the set force, the valve device 10 may be used as a one-way valve or an overflow valve. When the set force lies within the range that a normal pump fluid pressure in fluid channel 16 will provide enough pressure to open the valve, but however the same normal pump fluid pressure in fluid channel 17 will not provide enough pressure to open the valve, the valve may be used as a one-way valve. If the pressure needed to open the valve exceeds normal pump fluid pressures for both fluid channels 16, 17 the valve device 10 may be used as an overflow valve. It is also possible that normal pump fluid pressures in both fluid channel 16 and fluid channel 17 may be enough to open the valve. In such case, the valve device 10 may be used as a bidirectional valve.

Figure 3:
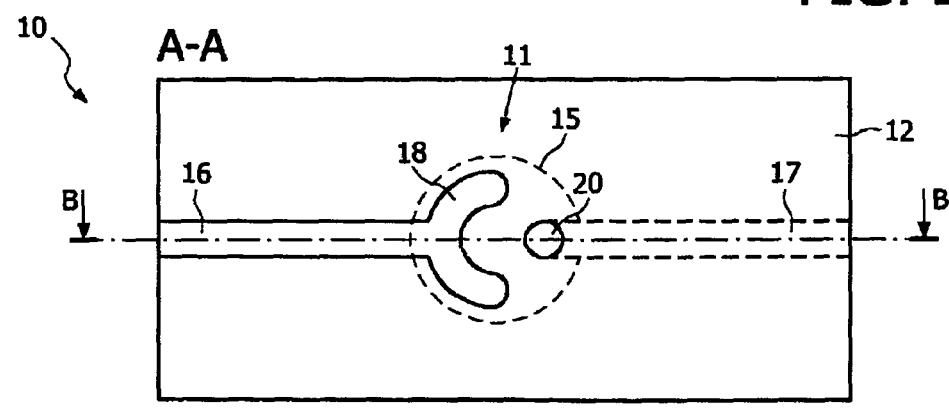
FIG. 3 shows a bottom view of a second embodiment of a valve device according to the present invention.
Figure 4:
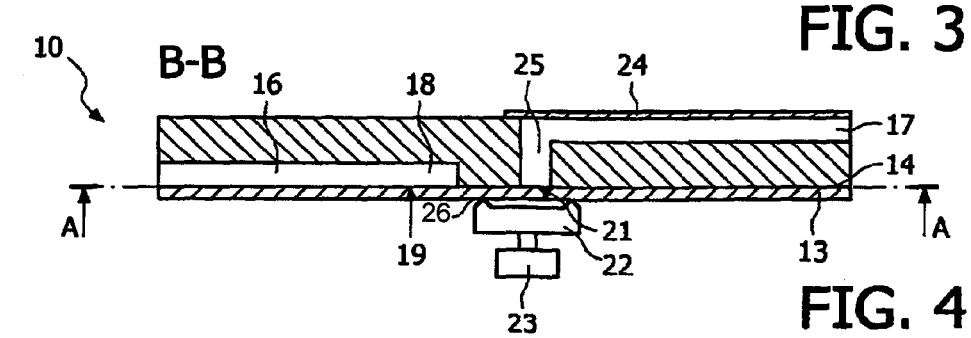
FIG. 4 shows a side view of a cross section of the second embodiment of FIG. 3.

FIGS. 3 and 4 show a second embodiment of a valve device according to the present invention. In these figures the same parts as the parts of the valve device of FIGS. 1 and 2 are indicated with the same reference numerals.

In general the construction of the valve device 10 of FIGS. 3 and 4 corresponds with the construction of the valve device 10 of FIGS. 1 and 2. Hereinafter only the differences will be discussed.

Fluid channel 17 generally runs on the side of the substrate 12 which lies opposite the membrane 13. Again the fluid channel is made by a groove which is open at a longitudinal side, which groove is covered by a membrane 24. However this membrane 24 may also be any other element which is suitable to close the groove. The fluid channel 17 is in fluid communication with the opposite side of the substrate (i.e. the side on which the membrane 13 is placed) via a through going channel 25 which may for instance be molded or drilled in the substrate 12. This alternative embodiment is also relatively easily to produce and makes it possible that two fluid channels can cross (one on each side of the substrate 12). In such way it is possible to provide a more complex fluid handling and flow on single layer substrate.

The plunger 22 comprises a continuous rim 26 which surrounds the channel end surface 21 of the fluid channel 17. This rim 26 protrudes from the head surface of the plunger 22. This protruding rim 26 provides a better sealing of the membrane 13 on the substrate 12, and therewith a better closing of the valve device 10. In the present embodiment the rim surrounds the channel end surface 21 of the fluid channel 17. It is also possible that the rim is not continuous, but runs from one side of the valve area 15 to another side. In any case the rim should substantially divide the valve area 15 in two parts. One of the channel end surfaces 19, 21 should lie in one part and the other channel end surfaces 21, 19 should lie in the other part.

Rim within the meaning of the present invention may comprise any protruding edge or such which improves the sealing of the membrane 13 on the substrate 12.

The pressure device 23 of the embodiment of FIGS. 3 and 4 is actuable, which means that for instance by using a control device the force with which the plunger 22 is pressed against the membrane 22 may be changed. This makes it possible to switch the characteristics of the valve device 10, for instance dependent on the progress of the fluid handling process. The pressure device may for instance be a pneumatic or hydraulic cylinder, or a mechanical or electromechanical device.

When for example the valve device is used as a one-way (unidirectional) valve the force level needed to open the valve may be changed so that for instance when is known that a certain fluid chamber is filled the force level can be lowered so that the one-way valve is opened and the excess fluid can be expelled. In such case there is no need to increase the fluid pressure to a 'above normal' level before the fluid is allowed to pass through the valve.

Also in the case of a bidirectional valve the force level to open the valve can be made dependent on the circumstances. If for instance a fluid flow from the fluid channel 17 to the fluid channel 16 is desired the pressure of the plunger 22 can temporarily be reduced.

Moreover, the actuable pressure device makes it possible to switch between different valve device modes (unidirectional, overflow and bidirectional) dependent on the process requirements by setting the opening force level to a level which is specific for that mode.

It will be clear for the man skilled in the art that many modifications and alterations within the concept of the present invention are possible. Such modifications and alterations are deemed to fall within the scope of the present invention as set forth in the following claims.

The invention claimed is:

1. A valve device comprising:
   a substrate comprising first and second grooves each extending into and ending in a valve area, each groove including an end in the valve area;
   an elastic membrane providing a fluid tight connection with the substrate except at the valve area thereby forming a valve at the valve area and forming first and second channels at the first and second grooves respectively, an area of the end of the first groove is substantially larger than an area of the end of the second groove and the end of the first groove is horseshoe shaped with branches forming an opening having a larger diameter than a diameter of the end of the second groove;
   a plunger provided in the valve area for selectively pressing against the membrane in at least a part of the valve area on a side opposite the substrate; and
   a pressure device configured to press the plunger against the membrane.

2. The valve device according to claim 1, wherein the membrane forms at least a part of a longitudinal wall of the first and/or the second channels.

3. The valve device according to claim 1, wherein the valve device is configured as a passive valve device.

4. The valve device according to claim 1, wherein the valve device is configured as an overflow valve.

5. The valve device according to claim 1, wherein the pressure device presses the plunger against the membrane with an adjustable force.

6. The valve device according to claim 5, wherein the pressure device is actuable to adjust the force.

7. The valve device according to claim 1, wherein the pressure device comprises a spring, selected from at least a leaf, mechanical, pneumatic, electric or magnetic spring.

8. The valve device according to claim 1, wherein at east one valve device is configured in a membrane based fluid system.

* * * * *